March 27, 1934.  M. SCHNAIER  1,952,688
FOOD PRODUCT
Filed March 28, 1931
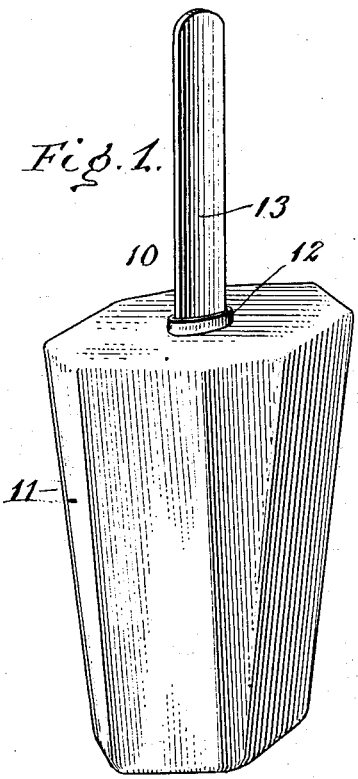
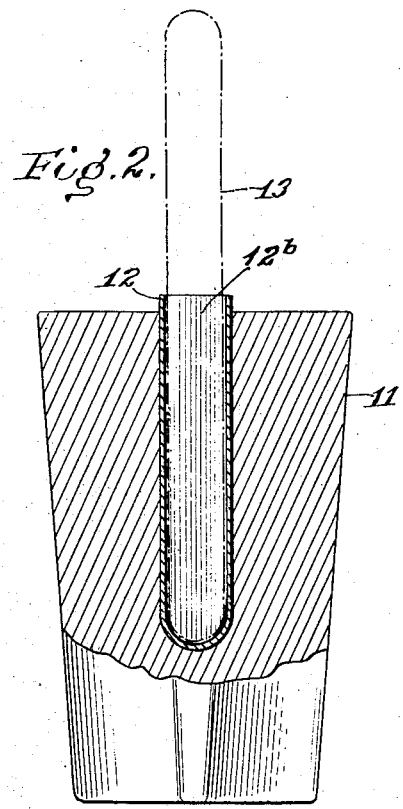
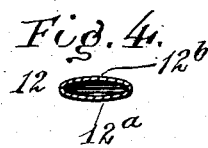
 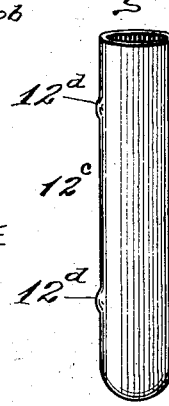 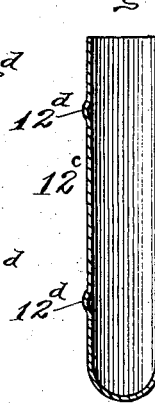 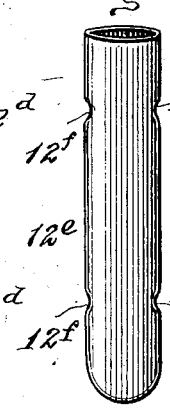 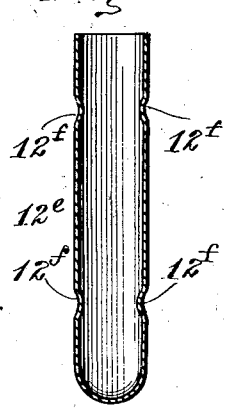
INVENTOR
Milton Schnaier
BY Conrad A. Dieterich
his ATTORNEY Patented Mar. 27, 1934

1,952,688

UNITED STATES PATENT OFFICE 1,952,688

FOOD PRODUCT

Milton Schnaier, New York, N. Y.

Application March 28, 1931, Serial No. 525,909

12 Claims. (Cl. 99—16)

My invention relates to improvements in food products, and the same has for its object, more particularly, to provide a simple, inexpensive and efficient means for holding or supporting a congealed or solidified confection to facilitate the eating thereof.

Further, said invention has for its object to provide a confection consisting essentially of a body portion formed of congealable or solidifiable edible substance having incorporated therewith means for receiving a handle or support, which means is adapted to become integral with said body portion in the course of the congealing or solidifying thereof.

Further, said invention has for its object to provide a confectionary consisting of a body portion formed of edible substance having incorporated therein a rigid socket member which is adapted to detachably receive a handle member or support to facilitate the eating of said product.

Further, said invention has for its object to provide a confection consisting of a body portion composed of frozen or solidified liquid or semi-liquid or plastic mass having imbedded therein a socket member provided with means for anchoring the same therein, and to prevent the withdrawal therefrom.

Other objects will in part be obvious and in part be pointed out hereinafter.

To the attainment of the aforesaid objects and ends, my invention consists in the novel features of construction, and in the combination, connection and arrangement of parts hereinafter more fully described and then pointed out in the claims.

In the accompanying drawing—

Figure 1 is a perspective view showing one form of confection constructed according to and embodying my said invention;

Fig. 2 is a side elevation of the same partly broken away and in section;

Fig. 3 is a detail perspective view of the socket member shown at Figs. 1 and 2;

Fig. 4 is a transverse section on the line 4—4 of Fig. 3;

Fig. 5 is a similar view showing a modified form of socket, and the anchoring means therefor;

Fig. 6 is a central longitudinal section of the form shown at Fig. 4;

Fig. 7 is a view similar to Fig. 4 illustrating a further modification, and

Fig. 8 is a central longitudinal section of the form shown at Fig. 6.

In said drawing, referring to Figs. 1 and 2, 10 designates a frozen confection comprising a body-portion 11 composed of a suitable fluid, combined with flavoring syrup or the like which is formed in a mold of any suitable shape or size and subjected to refrigeration or other action to cause the same to congeal or solidify. While the body portion 11 is still in fluid, or semi-fluid or plastic state and within its mold, a shell or socket member 12 formed of suitable material, such for example, aluminum, is inserted into and suspended centrally within said mass with its open, upper end projecting slightly above the level of the liquid or mass constituting said body-portion 11. The said shell or socket member 12 is closed at its lower end and has its major wall portions 12$^a$, 12$^b$ slightly convexed so as to prevent the collapsing or flattening of the socket member which might occur due to contraction during the freezing or solidifying action or operation and so as to form a cavity or socket having a flattened oval cross-section and extending into the confines of the body 11 substantially coextensively with the length of the socket member 12. The wall portions 12$^a$ and 12$^b$ interiorly reinforce the body portions 11, and member 12 provides an abutment at the closed end thereof for engagement with the end of a stick or handle 13 received within the cavity. The member or shell 12 embedded or anchored within the body portion 11 is of a length forming a comparatively deep socket within the confines of said body portion and is adapted to receive and engage a substantial portion of the length of the stick or handle 13 so as to brace a substantial part thereof to prevent wabbling or canting thereof within the socket. The closed end of the member 12 prevents the stick or handle 13 from being pushed through the material of the body portion, and receives the thrust of the mass 11 when the same is supported on and about the stick 13 in a position inverted relative to that shown in Figs. 1 and 2.

When the mass constituting the body portion 11 has become solidly frozen or solidified the same is withdrawn from its mold and put aside for sale or use. When the confection is to be eaten, a handle member or support 13 consisting of a relatively thin, flat stick or similar article is inserted or forced into the exposed open end of the socket member 12 and caused to frictionally engage with the inner sides or walls. The stick is thus retained within the flattened socket against axial rotation or movement therein.

At Figs. 5 and 6, is shown a modified form of socket member 12$^c$ which is provided along each of its smaller wall portions or edges with outwardly-projecting knobs or projections 12ᵈ which serve to anchor the socket member firmly within the frozen or solidified mass 11, and prevent the accidental withdrawal or disengagement of said socket member from said frozen or solidified mass.

At Figs. 7 and 8 a further modified form of socket member is shown. The construction of the socket member 12ᵉ is substantially the same as that shown at Figs. 5 and 6 except that the projections or knobs 12ᵈ are replaced by inwardly extending recesses or indentations 12ᶠ into which the body portion 12, before it freezes or solidifies, may enter to anchor the socket member 12ᵉ firmly within the solidified mass or body portion and thus prevent any longitudinal or other movement thereof relative to said mass or body portion 11.

While I have shown and described my said invention in connection with a frozen confection such as water-ice, sherbet or ice cream or similar substance it will, of course, be obvious that the same is equally applicable to other substances, such for example as candy or other food articles into which the socket member may be introduced while said candy or other food product is in a liquid, semi-liquid or plastic state, and which thereafter congeals or solidifies.

The terms "congeal" and "congealable", as herein used, are intended to include solidification of the edible fluid, semi-fluid or plastic mass due to any cause or operation, such as for example, refrigeration, baking, drying or other forms of hardening.

Having thus described my said invention, what I claim and desire to secure by Letters Patent is:

1. A food product of the character described comprising a body composed of a solidified edible substance, and a hollow wall portion imbedded in said body; said wall portion reinforcing the interior of said body and forming a socket within said body and open to the exterior thereof; said socket being adapted to receive a member serving as a handle or support.

2. A food product of the character described comprising a hollow shell imbedded in a body composed of a congealed edible substance; said shell being closed at the inner end thereof and being open at the outer end thereof exteriorly of said body, and forming a socket of substantial depth within said body for receiving a separate handle member.

3. A food product of the character described comprising a hollow member imbedded in a body composed of a congealed edible substance and having means formed in the wall thereof interlocking with the congealed substance to anchor said member therein; said member forming a socket within said body for receiving a separate handle member.

4. A food product of the character described comprising a hollow metallic shell imbedded in a body composed of an edible substance congealed about the shell; said shell forming a socket within said body and having an opening thereinto slightly beyond said body; and said socket being adapted to receive the inner portion of a separate member projecting at the outer portion thereof, beyond said body to form a handle.

5. A food product of the character described comprising a hollow shell imbedded for substantially the entire length thereof in a body composed of a frozen edible substance; said shell forming a socket within said body and having an opening thereinto contiguous to one end of said body, and a member received at one end within said socket and projecting at the other end beyond the socket to form a handle.

6. A food product of the character described comprising a hollow shell imbedded in a body composed of a congealed edible substance, and having means thereon for anchoring said shell in the congealed mass; said shell forming a socket within said body and being adapted to receive a handle member.

7. A food product of the character described comprising a hollow member open at one end imbedded in a body composed of a solidified edible substance; said member forming a socket within said body for receiving through the open end of said member a member serving as a handle; and the wall of said socket having anchoring means formed therein interlocking with the edible mass solidified about the same.

8. A food product of the character described comprising a hollow wall portion imbedded in a body composed of a solidified edible substance; said wall reinforcing the interior of said body and forming a socket within said body portion; and the wall of said socket having a plurality of indentations therein interlocking with the mass solidified about the same.

9. A food product of the character described comprising a hollow member imbedded in a body composed of an edible substance congealed about said member, said member having opposite exteriorly convex wall portions forming a flattened socket therebetween within said body; and a member detachably secured within said socket and projecting at the outer end thereof beyond said socket and said body to form a handle.

10. A food product of the character described comprising a hollow shell imbedded in a body composed of an edible substance congealed about the shell; said shell having exteriorly convex wall portions resisting the pressure of the congealed mass, and forming therebetween a socket of relatively flat oval cross-section for receiving a handle member or support.

11. A food product of the character described comprising a member having opposite exteriorly convex walls forming a narrow socket therebetween having an opening at one end; said walls having indentations therein, and a body composed of an edible substance solidified about said wall portions in interlocking relation with said indentations.

12. A food product of the character described comprising a hollow wall portion imbedded in a body composed of a solidified edible substance; said wall portion reinforcing the interior of said body and forming a socket extending inwardly within the confines of said body; the wall of said socket having indentations therein interlocking with the solidified edible mass about the same; and said socket serving to receive a member adapted to project beyond the edible mass to form a handle.

MILTON SCHNAIER.